Oct. 3, 1967 C. F. CHRISTIAN 3,345,558
AUTOMATIC SLOPE CONTROL FOR ARC WELDING MACHINES
Filed Sept. 22, 1964
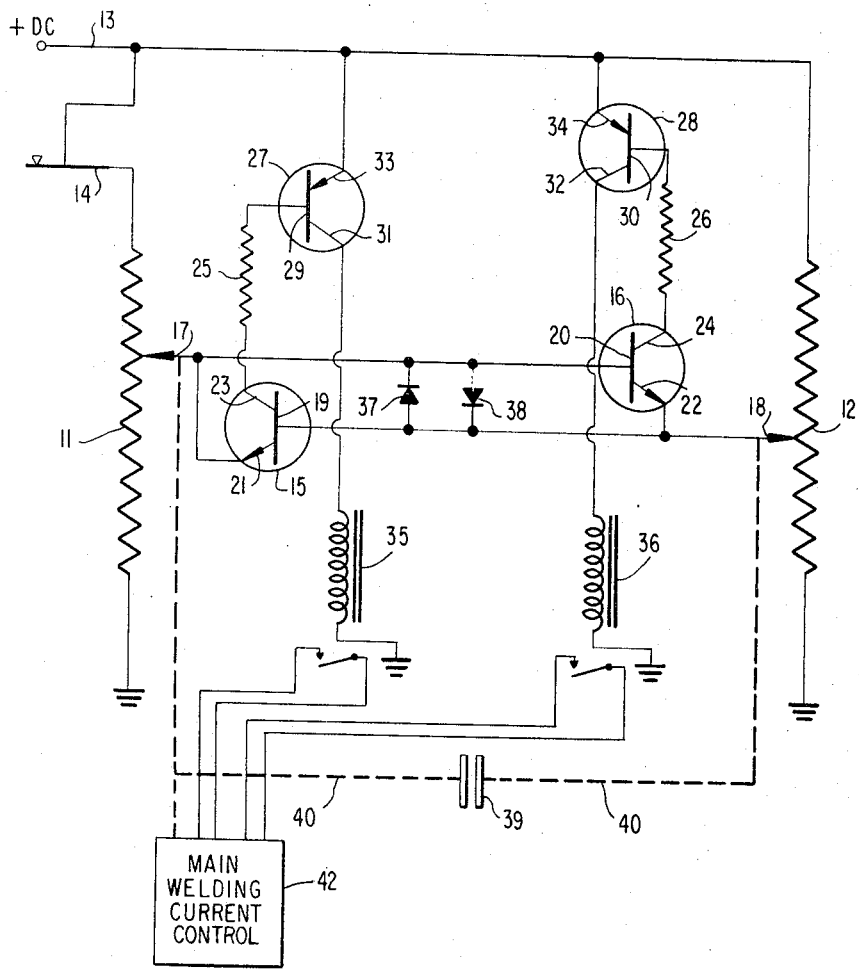
INVENTOR.
CARL F. CHRISTIAN
BY
Robert B. Harmon
ATTORNEY

United States Patent Office 3,345,558
Patented Oct. 3, 1967

3,345,558
AUTOMATIC SLOPE CONTROL FOR ARC WELDING MACHINES
Carl F. Christian, Mystic, Conn., assignor to General Dynamics Corporation, New York, N.Y., a corporation of Delaware
Filed Sept. 22, 1964, Ser. No. 398,207
6 Claims. (Cl. 323—75)

This invention relates to an automatic slope control for arc welding machines and more particularly a slope control which has a memory feature.

The current for arc welding machines is generally supplied from a source through one of two means, a saturable reactor or a moveable core. This invention is capable of controlling either type of current supply by merely using a potentiometer which is either lineal or rotational for the moveable core or saturable reactor respectively.

This control circuit was designed specifically to control a Westinghouse WSR welding machine, but can be applied to any other welding machine with a motor driven jog control, or to any machine by adding a motor driven jog control.

It is therefore an object of this invention to provide a simple slope control for arc welders.

Another object of this invention is to provide a slope control with memory features for use with arc welders.

Still another object of this invention is to provide a slope control with memory features which may be readily adopted for use with either a moveable core or a saturatable reactor type arc welder.

A further object of this invention is to provide a slope control with memory features which may be easily and economically manufactured.

The means by which the foregoing objects and other advantages, which will be apparent to those skilled in the art, are accomplished is set forth in the following specification and claims, and is illustrated in the accompanying drawing dealing with a basic embodiment of the present invention.

Referring now to the drawing: the resistance elements of potentiometers 11 and 12 are connected between a positive DC source 13 and ground forming what is essentially a Wheatstone bridge, the potentiometer 11 being connected to the source 13 through a switch 14. Potentiometer 11 is a slave potentiometer with wiper arm 17 mechanically connected to follow the motion of the usual moveable core or saturable reactor current control 42 of the welder. The wiper 17 picks a potential off the resistance element which is electrically proportional to the setting of the moveable core or saturable reactor, thus giving an indication of the magnitude of the welding current.

Wiper arm 18 of potentiometer 12 is mechanically connected to wiper arm 17 through an electrically controlled clutch 39. The mechanical connection is shown here by the broken line 40. The wiper shafts are mechanically connected during selective portions of the welding operation. The clutch is normally engaged during manual increase or decrease of the welding current. When the clutch is thus engaged, it mechanically couples the rotation of the slave potentiometer 11 to the control potentiometer 12, thus forcing the wiper arm of the control potentiometer 12 to follow the motion of the wiper arm of the slave potentiometer 11 keeping the Wheatstone bridge in balance. Through suitable relays (not shown), the clutch is not energized when the welder is increasing or decreasing current automatically, that is, when the slope control circuit is in command, rather than the manual switch. The wiper shafts will be connected during "jogging."

"Jogging" is that procedure whereby the operator increases or decreases the welding current by small increments usually by means of an over-ride push-button control. This is accomplished in most cases by a motor driven device built into the welding machine, and controlled by a front panel switch or push-buttons, and suitable limit switches to prevent damaging over-travel.

Transistors 15 and 16 form the primary unbalance sensing means for automatic control. Transistor 15 has its base 19 connected to wiper arm 18, its emitter 21 connected to wiper arm 17 and its collector 23 connected to the base 29 of transistor 27 through resistor 25. Transistor 16 is somewhat similarly connected, with its base 20 connected to wiper arm 17, its emitter 22 connected to wiper arm 18, and its collector 24 connected to the base 30 of transistor 28 through resistor 26. Transistors 27 and 28 are essentially switches which provide some amplification with their emitters 33 and 34 connected to the positive DC source 13 and collectors 31 and 32 connected to relays 35 and 36 respectively. These relays are the increase and decrease relays and their contacts (not shown) are connected in parallel with the contacts for the jogging control (not shown) built into the welder.

The operation of the control is as follows: when both wiper arms 17 and 18 are at the same electrical potential neither transistor 15 or 16 will conduct. When the wiper arms are not at the same potential because of automatic operation with the switch 14 open or manual adjustment of the welding current with the clutch 39 disengaged, a biasing condition occurs which will cause one transistor to conduct. The conduction of the sensing transistor will control the switching transistor causing the collector current, of the second transistor, to energize the proper relay. Obviously additional stages of amplifying transistors may be added if sufficient gain is not realized with the illustrated stages.

For example, if the wiper 18 of potentiometer 12 is moved manually by the operator in the direction of the positive voltage (wire 13), and the clutch 39 is not engaged, a biasing condition occurs because the bridge is now out of electrical balance. Wiper 18 will be positive with respect to wiper 17. This condition, because of the electrical connections shown on the drawing, will make the emitter 22 of the sensing transistor 16 be positive with respect to the base 20 of transistor 16, thus keeping transistor 16 in a non-conductive state. Similarly, base 19 of sensing transistor 15 will be positive with respect to emitter 21 of transistor 15 and transistor 15 will be biased into a conductive state. When transistor 15 is in the conductive state, base current will flow from base 29 of the second, or switching, transistor 27 through resistor 25 into collector 23 of transistor 15. When base current flows out of base 29 of transistor 27, transistor 27 is biased "on" or conductive, and transistor 27 will conduct the current to energize relay 35. The contacts of relay 35 will close and initiate energization of the built-in "jog" system of the welding machine and the welding machine will operate itself until bridge rebalance is restored. If the wiper 18 is moved in the opposite direction, the sensing transistor 16 will become conductive, causing the switching transistor 28 to energize the relay 36.

Furthermore, assuming that the bridge is initially balanced and the welding machine is performing its intended usage, and that the operator wishes to initiate a "down-slope" of welding current, switch 14 is opened. When switch 14 is opened, wiper 17 "sees" a very low voltage, compared to wiper 18. In essence, a very large resistance has been introduced in series with potentiometer 11 and wiper 17 is electrically very close to zero volts. Thus wiper 18 is quite positive with respect to wiper 17 and the bridge is considered unbalanced. When the switch 14 is closed again, the bridge will become balanced in the manner described above.

Diodes 37 and 38, connected between the emitters and bases of transistors 15 and 16 are only for protective purposes and are used in the forward direction to limit the emitter to base voltage to the forward drop of the diode.

The circuit also provides for a memory feature. An example of this operation is as follows: switch 14 is a normally closed decay heat switch. During decay, switch 14 is opened either automatically or by the operator. The electro-mechanical clutch is not engaged so that the wiper arm of the slave potentiometer 11 will follow the movable core or saturable reactor through the current decreasing cycle until stopped by the limit switches. During this decrease period, the wiper arm of the control potentiometer will not follow the wiper arm of the slave potentiometer. The wiper arm of the control potentiometer maintains its position as an electrical reference of the setting before decay was initiated, and the Wheatstone bridge is thereby unbalanced by the decay. Closing decay switch 14 will enable the control circuit which will now sense the unbalance and cause the proper relay to be energized resetting the welder at its previous setting.

The invention may be embodied in other specific forms without departing from the spirit of essential characteristics thereof. The present embodiment is therefore to be considered in all respects as illustrative and not restrictive, the scope of the invention being indicated by the appended claims rather that the foregoing description, and all changes which come within the meaning and range of equivalency of the claims are therefore to be embraced therein.

What is claimed and desired to be secured by Letters Patent in the United States is:

1. An automatic slope control for an arc welder comprising: a movable main welding current control means, a first and second potentiometer forming a Wheatstone bridge, the wiper arm of said first potentiometer being mechanically connected to and following the movement of the main welding current control means, an electromechanical clutch selectively mechanically connecting the wiper arms of said first and second potentiometers, said clutch being disengaged during decay operation, means responsive to an unbalance in said bridge for causing said potentiometers to be readjusted until said bridge is again in balance whereby, during decay, said wiper arm of the second potentiometer acts as a memory unit by holding its position while said wiper arm of the first potentiometer is driven to one extreme, said circuit sensing an unbalanced condition of said bridge causing said main welding current control means to be reset at its original setting.

2. An automatic slope control for an arc welder comprising: a moveable main welding current control for the arc welder, a first and second potentiometer forming a Wheatstone bridge, means responsive to an unbalance in said bridge causing said potentiometers to be adjusted to balance said bridge, said first potentiometer being mechanically connected to the main welding current control of said arc welder, an electro-mechanical clutch, said clutch mechanically connecting said first and second potentiometers in the engaged condition, said clutch being engaged during manual adjustment of said main welding current control, said clutch being disengaged during a decay cycle, said second potentiometer holding its position during the decay cycle while said first potentiometer is driven with the main current control, whereby said second potentiometer functions as a memory device at the end of the decay cycle by being a fixed reference for rebalancing said Wheatstone bridge.

3. An automatic slope control for arc welding machines comprising: a moveable main welding current control for the arc welder, first and second potentiometers forming a Wheatstone bridge, mechanical means connecting the wiper arm of said first potentiometer to the main welding current control, an electromechanical clutch, said clutch in the engaged condition mechanically coupling the wiper arms of said potentiometers, said clutch being engaged only during manual adjustment of said main welding current control, means responsive to an unbalance in said bridge whereby said main welding current control will be driven which in turn will cause said wiper arm of said first potentiometer to be adjusted until said bridge is again balanced, said wiper arm of said second potentiometer having remained stationary so as to provide a memory device.

4. An automatic slope control for an arc welder comprising: a moveable main welding current control for the arc welder, first and second potentiometers having wiper arms and forming a Wheatstone bridge, means connecting the wiper arm of said first potentiometer as a slave to the main welding current control of said welder, an electromechanical clutch means selectively connecting the wiper arms of said potentiometers only during manual adjustment of the main welding current control, relay means for initiating driving of the main welding current control, and means responsive to an unbalance in said bridge for energizing the relay means which cause said main welding current control to be driven until said first potentiometer wiper arm has reached a position where said bridge is in a balanced condition.

5. An automatic slope control for an arc welder according to claim 4 wherein said means for sensing an unbalance comprises a pair of transistors, the base of said transistor being connected to one of the wiper arms of said potentiometers, the emitter of each said transistor being connected to the other of said wiper arms, the main welding current including control relays, and the collector of each of said transistor being connected to said control relays.

6. An automatic slope control for an arc welder according to claim 4 wherein said relay means include contacts connected in parallel with the main welding current control of said arc welder.

References Cited

UNITED STATES PATENTS

| | | | |
|---|---|---|---|
| 2,423,228 | 7/1947 | Conklin | 318—29 X |
| 2,846,630 | 8/1958 | Boyce et al. | 323—75 |
| 2,914,717 | 11/1959 | Redding | 318—20.810 |
| 2,951,972 | 9/1960 | Pomazal | 219—131 X |
| 2,971,142 | 2/1961 | Montross | 323—75 |
| 3,028,531 | 4/1962 | Heiberger et al. | 318—20.810 |
| 3,068,388 | 12/1962 | Burski | 323—75 |

JOHN F. COUCH, *Primary Examiner.*

A. D. PELLINEN, *Assistant Examiner.*